US011258078B2

(12) United States Patent
Cordatos et al.

(10) Patent No.: US 11,258,078 B2
(45) Date of Patent: Feb. 22, 2022

(54) CONDUCTOR ASSEMBLY

(71) Applicant: Hamilton Sundstrand Corporation, Charlotte, NC (US)

(72) Inventors: Haralambos Cordatos, Colchester, CT (US); Peter J. Walsh, Wethersfield, CT (US); Theresa A. Hugener, Coventry, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 159 days.

(21) Appl. No.: 16/536,755

(22) Filed: Aug. 9, 2019

(65) Prior Publication Data

US 2021/0043949 A1    Feb. 11, 2021

(51) Int. Cl.
*H01M 8/0271* (2016.01)
*H01M 8/1004* (2016.01)
*H01M 8/1069* (2016.01)
*H01M 8/1086* (2016.01)

(52) U.S. Cl.
CPC ....... *H01M 8/0271* (2013.01); *H01M 8/1004* (2013.01); *H01M 8/1079* (2013.01); *H01M 8/1086* (2013.01)

(58) Field of Classification Search
CPC .................................................. H01M 8/0271
USPC .......................................................... 429/508
See application file for complete search history.

(56) References Cited

U.S. PATENT DOCUMENTS

| 4,987,274 A | 1/1991 | Miller et al. |
| 2012/0208366 A1 | 8/2012 | Chan et al. |
| 2014/0057094 A1 | 2/2014 | Su |
| 2018/0041086 A1 | 2/2018 | Madbouly et al. |
| 2018/0265973 A1 | 9/2018 | Firouzdor et al. |

FOREIGN PATENT DOCUMENTS

| CN | 103078134 A | 5/2013 |
| EP | 0572177 A1 | 12/1993 |
| JP | 2006186330 A | 7/2006 |

OTHER PUBLICATIONS

Extended European search report issued in corresponding EP application No. 19214585.2, dated Jul. 6, 2020.

*Primary Examiner* — James M Erwin
(74) *Attorney, Agent, or Firm* — Locke Lord LLP; Scott D. Wofsy; Georgi Korobanov

(57) ABSTRACT

A conductor assembly including an electrically conductive material defining a longitudinal axis, a microporous membrane surrounding the electrically conductive material defining a series of pores, and a ceramic material within at least a first portion of the series of pores.

4 Claims, 1 Drawing Sheet

CONDUCTOR ASSEMBLY

BACKGROUND

Technological Field

The present disclosure relates to dielectric device, and more particularly to polymer ceramic hybrid dielectric.

Description of Related Art

High-voltage power distribution systems require electrical insulators that combine high dielectric strength with high thermal conductivity in a flexible (bendable) structure. High thermal conductivity yet low dielectric constant, high dielectric strength combined with mechanical flexibility, and the ability to form defect-free structures at reasonably large scale while maintaining their long-term integrity and dielectric properties even in high-humidity environments are all desirable characteristics.

The conventional methods and systems have generally been considered satisfactory for their intended purpose. However, there is still a need in the art for a dielectric material having improved electrical and thermal conductivity. There also remains a need in the art for such a material and components that are economically viable. The present disclosure may provide a solution for at least one of these remaining challenges.

SUMMARY

A conductor includes an electrically conductive material defining a longitudinal axis, a microporous membrane surrounding the electrically conductive material defining a series of pores, and a ceramic material within at least a first portion of the series of pores, and can further include a non-porous layer surrounding the microporous membrane. A sealant material can be located within at least a second portion of the series of pores. The first portion of the series of pores is significantly smaller than the second portion of the series of pores.

The microporous membrane can include a polymeric matrix and a spherulitic structure. At least a portion of the series of pores of the microporous membrane can be aligned orthogonal to the longitudinal axis. The microporous membrane can include a thermoplastic fluoropolymer material, such as PEEK, PTFE or PVDF or a silicone material. The ceramic material can includes a boron nitride or aluminum nitride.

A method of manufacturing an electrical conductor includes depositing a microporous membrane over electrically conductive material such that a series of pores are formed within the microporous membrane, filling at least a first portion of the series of pores with a ceramic material, and filling at least a second portion of the series of pores with a polymeric electrically insulating sealant. Filling the first portion of the series of pores can include atomic layer deposition, which is plasma enhanced. The method further including exposing the microporous membrane to a plasma mixture containing a ceramic precursor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
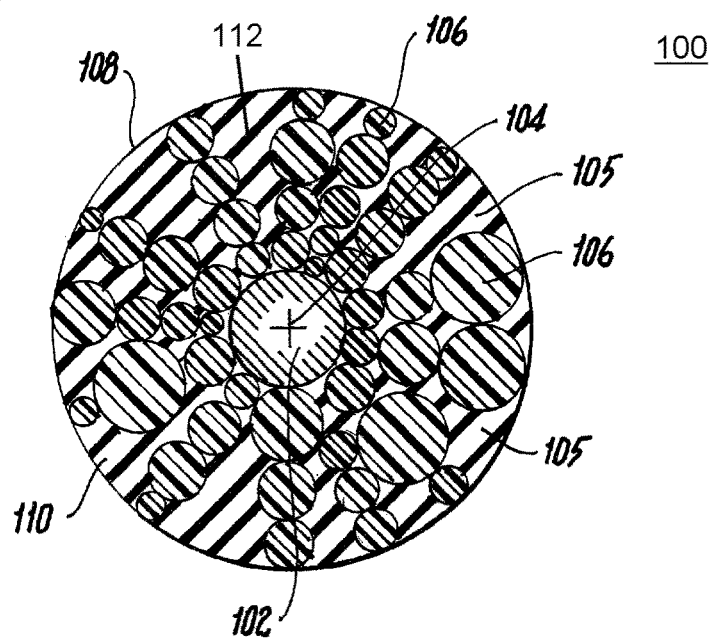
FIG. 1 is a cut away view of a dielectric material, showing a cross-sectional view of the material of FIG. 1 along the transverse axis.
Figure 2:
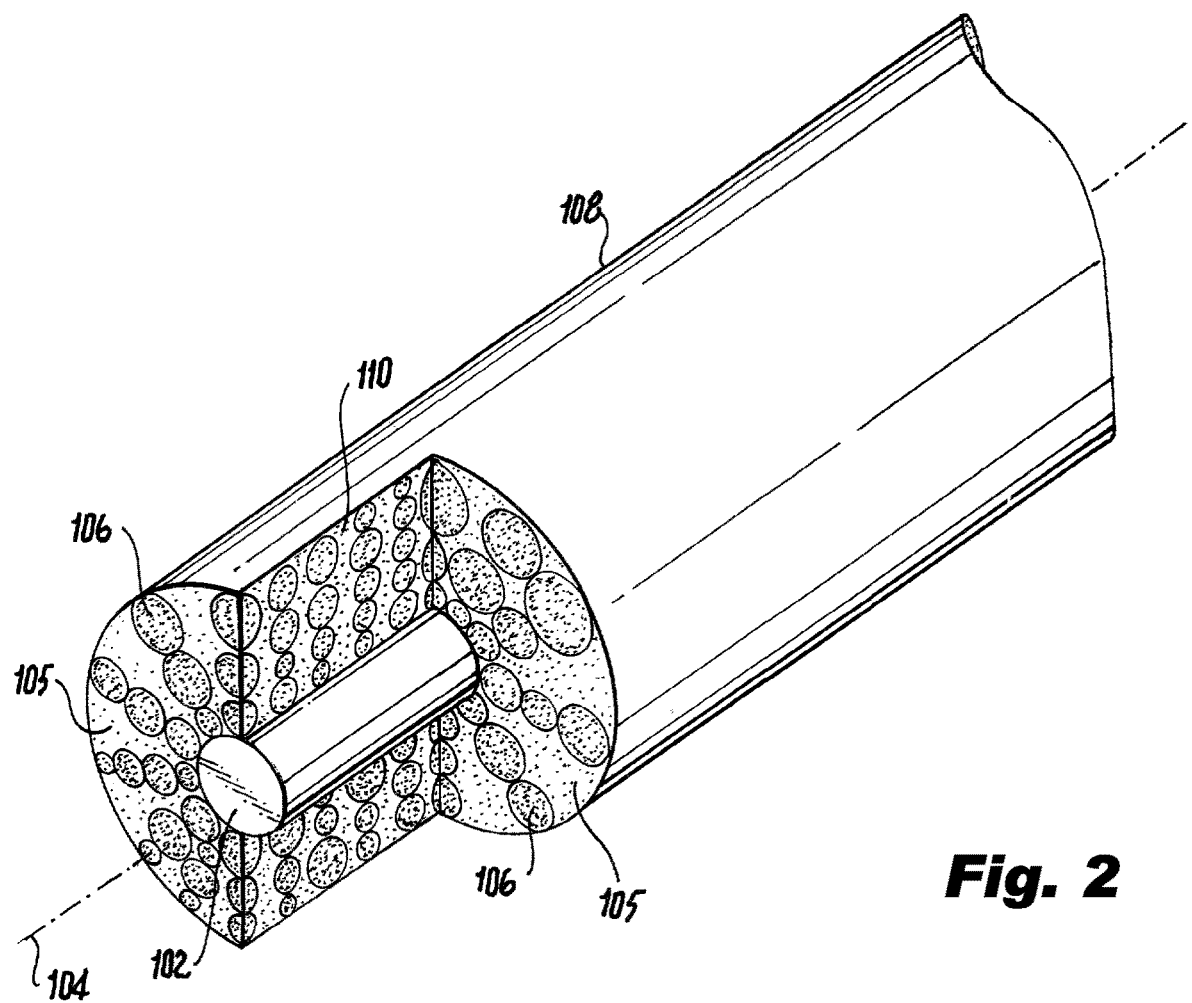
FIG. 2 is a cut away view of FIG. 1, showing a cross-sectional view of the material of FIG. 1 along the longitudinal axis.

Reference will now be made to the drawings wherein like reference numerals identify similar structural features or aspects of the subject disclosure. For purposes of explanation and illustration, and not limitation, a partial view of an exemplary embodiment of a conductor in accordance with the disclosure is shown in FIG. 1 and is designated generally by reference character 100. Other embodiments of the material in accordance with the disclosure, or aspects thereof, are provided in FIG. 2, as will be described. The methods and systems of the disclosure offer a unique approach to a hybrid material having a continuous thermally conductive ceramic phase within a flexible polymeric phase to thus improve thermal conductivity while maintaining electrical insulation.

In particular, electrical insulators fall broadly into two materials categories: polymeric and ceramic. Polymeric materials have the flexibility required to form around metal conduits and to withstand stresses due to bending and vibrations; however, they have very low thermal conductivity. Certain electrically insulating ceramics have two orders of magnitude higher thermal conductivity than polymers, but in a monolithic structure they are highly susceptible to stress cracking. Hence, a hybrid structure that combines the flexibility of a polymer insulator with the thermal conductivity of a ceramic insulator enables synergies towards these conflicting requirements better than either material class alone.

FIG. 1 shows a conductor assembly 100 an electrically conductive material 102 defining a longitudinal axis 104, a microporous membrane 106 surrounding the electrically conductive material 102 defining a series of pores 105, and a ceramic material 110, such as a heat conductive, electrically insulating inorganic fillers within at least a portion of the series of pores. The pores of the microporous membrane 106 are aligned orthogonal to the longitudinal axis 104. By incorporating the ceramic material 110 in the pores 105 of the microporous membrane 106, heat transfer along the transverse direction is improved. A non-porous layer 108 surrounds the microporous membrane 106. In one embodiment, the microporous membrane 106 includes a polymeric matrix of pores and a spherulitic structure. The microporous membrane 106 includes a thermoplastic fluoropolymer material, such as poly (ether ether ketone) a.k.a. PEEK, PTFE, or PVDF or a silicone material. It is beneficial to utilize the polymeric microporous membrane 106 as a substrate as PEEK is capable of continuous use at 250° C., which is more than 100° C. higher than PVDF, but has lower dielectric strength; therefore, its use as the microporous matrix is targeted to applications where maximizing thermal conductivity is more important than maximizing dielectric strength, whereas PVDF would be targeted to applications where maximizing dielectric strength is most important.

The ceramic material includes a boron nitride or aluminum nitride. The structure maximizes heat transfer along the cross-direction, by incorporating heat-conductive, electrically insulating inorganic fillers, the ceramic material 110 in the microporous membrane 106. A sealant material 112 can be deposited within the series of pores into an area between the pores 105, it may be desirable to fill the polymeric matrix void space only partly with the ceramic phase and back-fill the remaining void space with a polymeric electrically insulating sealant (e.g. silicone). At the early stage of ceramic deposition from the vapor phase, there is adequate void space in each of the pores such that deposition is essentially uniform along the axial direction. As the pores fill with the ceramic phase, precursor diffusion toward the longitudinal axis of the conductor (i.e. farther from the outer surface) becomes progressively inhibited by the deposited ceramic layers, resulting in a relatively thicker ceramic layer near the entrance of each pore. By leaving a portion of the microporous membrane 106 open, the pores at the surface can remain uncovered. If pores at the surface are covered, the path of precursors toward the longitudinal axis would be blocked and leave undesirable void spaces within the insulator.

A method of manufacturing the electrical conductor 100 is also disclosed. The method includes depositing a microporous membrane over electrically conductive material such that a series of pores are formed within the microporous membrane, filling at least a first portion 111 of the series of pores with a ceramic material, and filling at least a second portion 113 of the series of pores with a polymeric electrically insulating sealant, wherein filling the first portion of the series of pores includes atomic layer deposition. Filling the pores formed within the microporous membrane with the ceramic done by atomic layer deposition is required because a slurry-base method would result in the annealing temperature for the ceramic far exceeding the temperature capability of the polymer matrix and further the slurry volume would be too large to fill voids with a concise amount of ceramic material. Atomic Layer Deposition (ALD) is a viable approach for allowing for the deposition to be carried out at much lower temperatures and a more controlled deposition.

The methods and systems of the present disclosure, as described above and shown in the drawings, provide for a dielectric material with superior properties. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of manufacturing an electrical conductor comprising:
    depositing a microporous membrane defining a plurality of pores around an electrical conductor; and
    filling at least a first portion of the plurality of pores with a ceramic material, wherein filling the first portion of the plurality of pores is-includes atomic layer deposition.

2. The method of claim 1, further comprising filling at least a second portion of the plurality of pores with a polymeric electrically insulating sealant.

3. The method of claim 1, wherein the atomic layer deposition is plasma enhanced.

4. The method of claim 3, further comprising exposing the microporous membrane to a plasma mixture containing a ceramic precursor.

* * * * *